United States Patent Office 3,136,130
Patented June 9, 1964

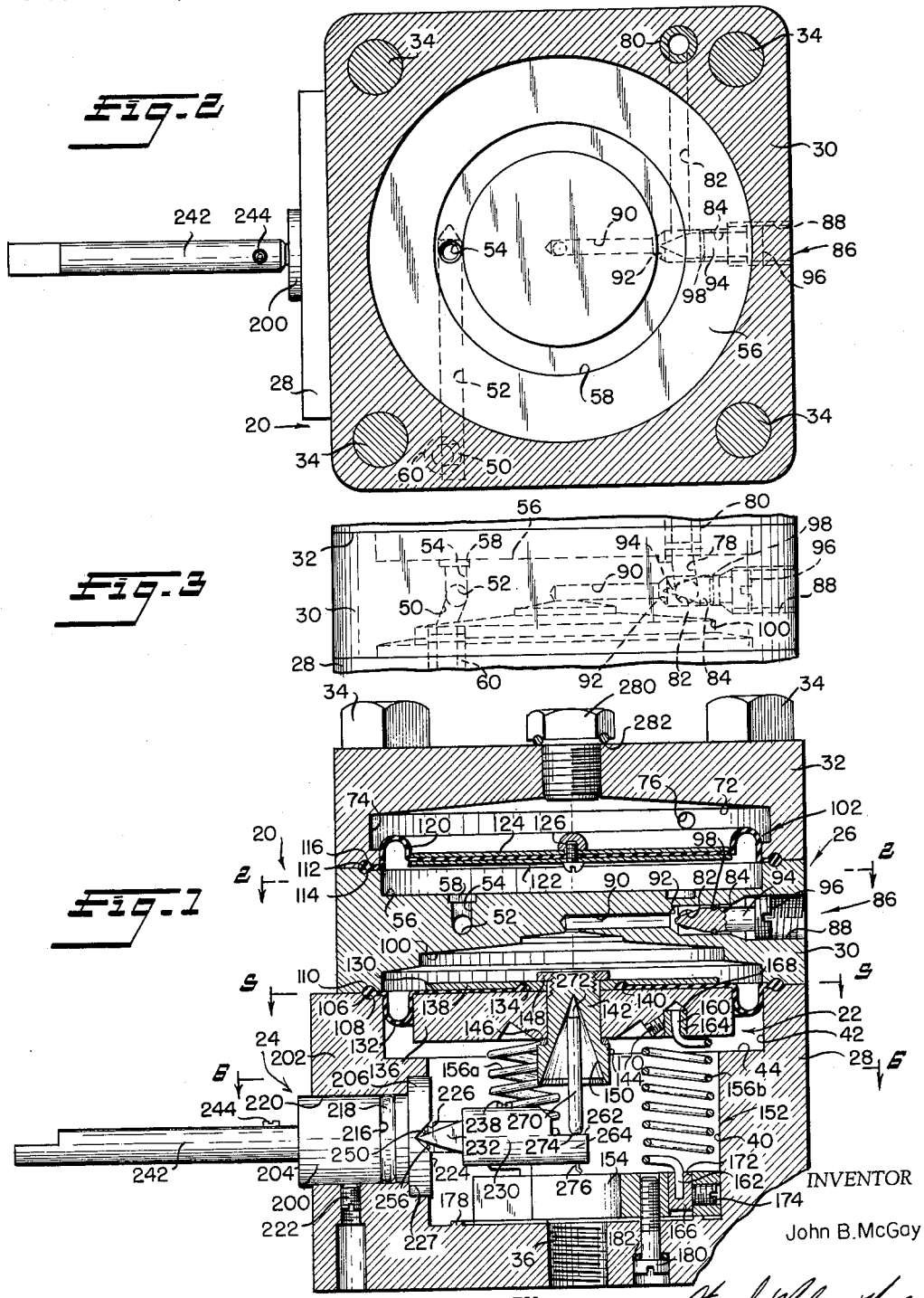

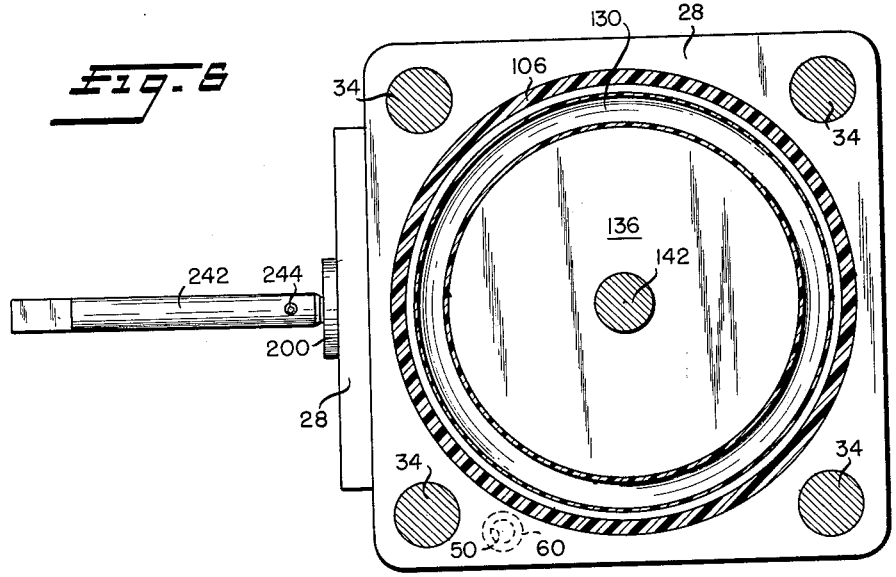
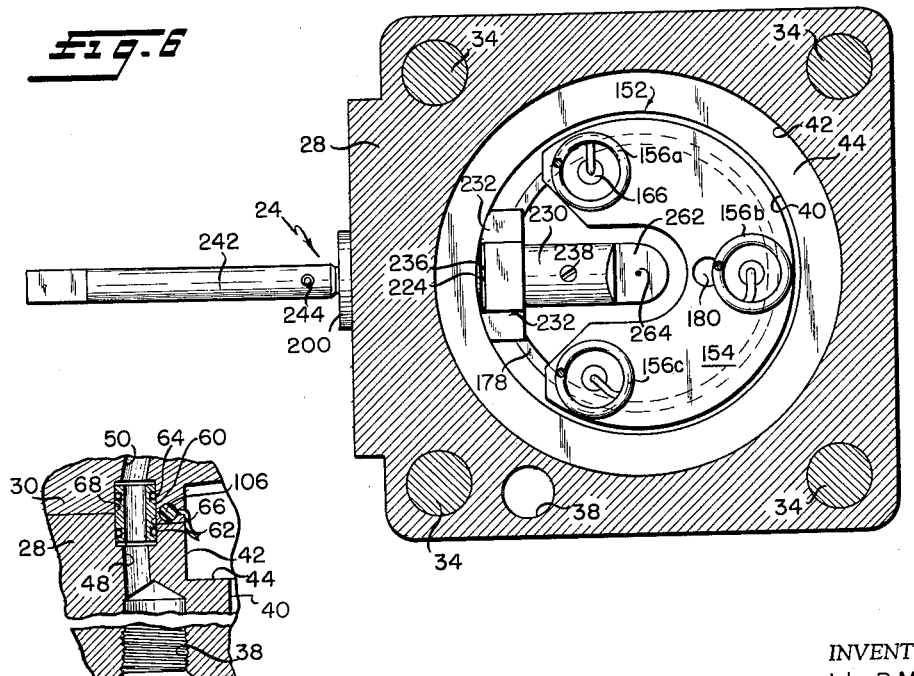

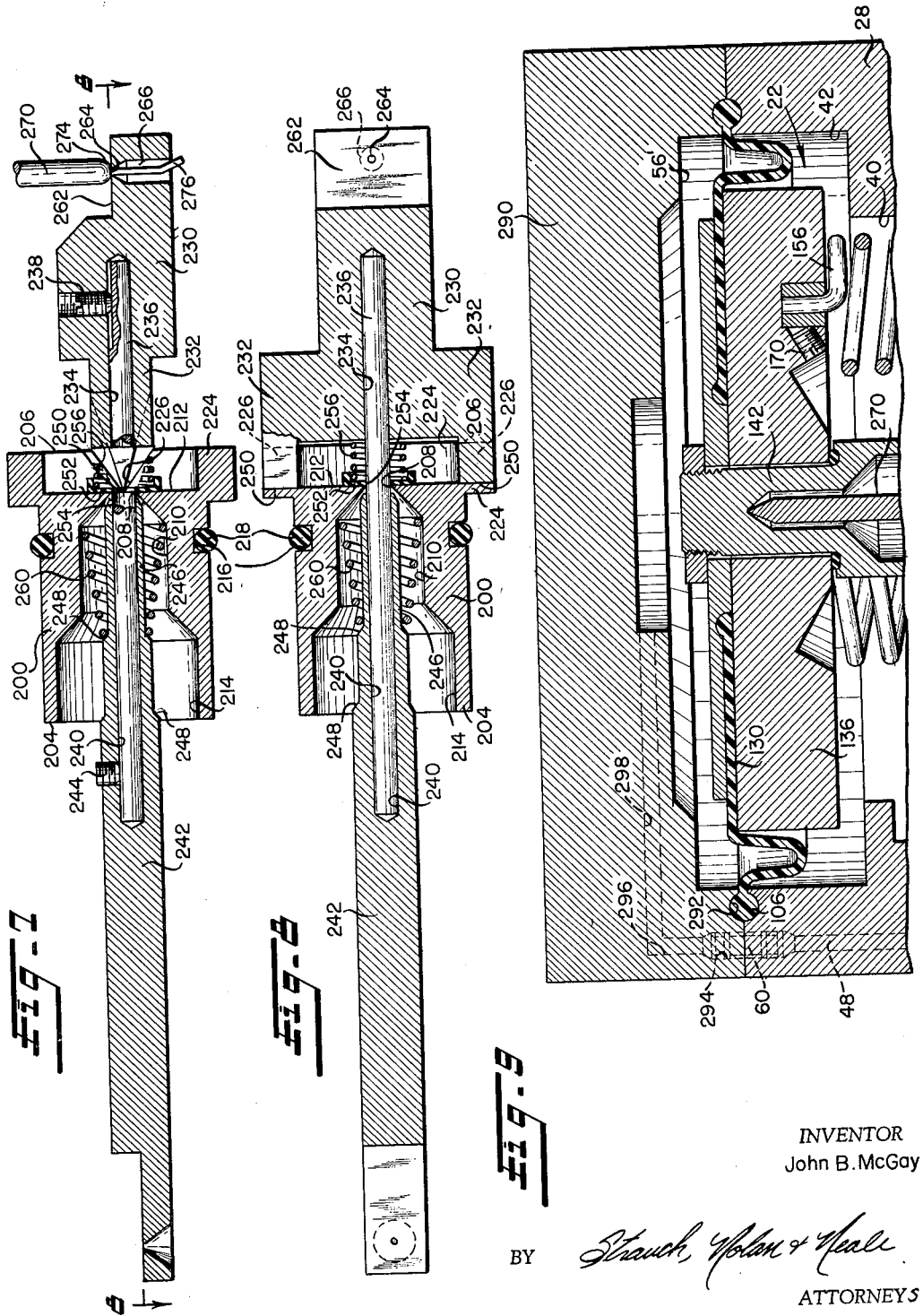

1

3,136,130
PRESSURE RESPONSIVE MEASURING DEVICE
John B. McGay, Tulsa, Okla., assignor to Rockwell Manufacturing Company, Pittsburgh, Pa., a corporation of Pennsylvania
Filed Oct. 12, 1960, Ser. No. 62,136
11 Claims. (Cl. 60—54.5)

This invention relates to a device for measuring changes in pressure and includes the mechanical movement for reproducing indications of such pressure changes. It more specifically relates to an improved differential pressure diaphragm orifice meter with a motion transmitting lever extending from the measuring chamber to the exterior of the meter, the combination being an improvement over the invention disclosed in copending application Serial No. 626,229 filed December 4, 1956, now abandoned.

Previously known diaphragm orifice meters have had certain disadvantages which are avoided by the present invention. One of the primary defects in differential pressure measuring devices has been the inability to avoid increments of friction loss which occur at the location where the transmitting mechanism passes through the measuring chamber wall. Also in previously known devices in which pure diaphragm type measuring components were used, there was a tendency for the diaphragm to rupture upon high surges of pressure in the line being measured and to overcome this deficiency the prior art often went to metallic bellows type measuring units, with which temperature compensation was necessary. This need for temperature compensation became magnified whenever the metallic bellows was filled with a fluid. Generally the prior art orifice meters were intended for specific installations in which a standardized biasing spring force was utilized and in order to permit variations in this biasing force numerous means were devised for changing the adjustment of the biasing spring. This in turn led to rather complex organizations of compound linkages which increased the initial cost and upkeep of the device.

The present invention avoids the aforenoted disadvantages and others which have been experienced with the prior art orifice meters and furthermore has resulted in a simplified orifice meter which can be manufactured at relatively low expense. In reaching these ends, this improved measuring device utilizes standardized components adaptable in various arrangements to be made applicable to a wide range of installations. The two basic forms of the meter encompassed by this invention use a standardized base component which includes a spring biased measuring diaphragm and supports the motion transmitting linkage arranged to provide an approximately lineal motion of diaphragm measurement through the transmitting linkage to the outside of the meter chamber, yet at the same time holding friction loss to a minimum. One form of the meter has two modular sections stacked above the base section to provide fluid-dampened measurements, the other form omitting the fluid-dampening aspect and thus utilizing only one modular section. The latter form results in an orifice meter with an extremely sensitive differential pressure indication.

Assembly installation of the diaphragms is quite simple because of the sectional construction of the meter and appropriate use of interior confining walls and stepped shoulders in the measuring chamber provide an arrangement to confine any ballooning of the diaphragm resulting from accidental over-pressurization and thus prevents diaphragm rupture. A pre-set unitary measuring diaphragm and biasing spring assembly provides removal and interchangeability by means of a very simple assembly change, enabling adaptation of standard components to installation in widely varying applications where pressure measurement values and ranges are varied. The arrangement of stacked modular sections which provides an arrangement of fluid dampening isolated from the measured fluid eliminates the need for temperature compensations and prevents contamination of the dampening fluid by the line fluid being measured.

Accordingly a primary object of this invention resides in providing a novel improved differential pressure measuring device including a spring biased diaphragm and essentially friction-free motion-transmitting linkage.

Another object resides in a provision of a diaphragm orifice meter constructed with stacked modular sections enabling use of standardized components to provide two basic types of diaphragm orifice meters, one having fluid dampening and the other having a direct extremely sensitive diaphragm measurement, each type including a combined measuring diaphragm and fixed spring assembly removable as a unit and interchangeable with other spring assemblies having different biasing force values.

Still another object resides in providing a differential measuring device in which the pressure-measuring component is an annular rubber-like diaphragm the peripheral rim of which is formed as an annular bead clamped in annular grooves between upper and lower chamber sections, the diaphragm central portion being clamped to a heavy carrier member supported by a series of springs secured to a base piece, the assembly of diaphragm, carrier member, springs and base piece being removably secured to the lower chamber section as a unit assembly, and an essentially friction-free motion-transmitting linkage connecting to the carrier member and passing through a wall of the chamber sections.

Still a further object in connection with the preceding object resides in the provision of additional modular sections replacing the upper section of the diaphragm measuring device and providing an additional chamber divided by a second diaphragm, the additional modular sections providing a servo-type motor arrangement filled with dampening fluid enabling the transmission of pressure measured by the second diaphragm through the dampening fluid to the primary measuring diaphragm. Still another object in connection with the arrangement providing fluid dampening resides in the provision of an adjustable metering control in integral passages formed in the upper modular sections between the fluid dampening chambers.

Another object resides in providing for use in differential pressure measuring devices, a removable diaphragm and biasing spring assembly which has a pre-set biasing force and constituting an interchangeable pre-set unit to provide heavier or lighter biasing ranges within a pressure measuring device.

A still further object resides in the provision, for use in a pressure measuring device, of an improved rocking motion transmitting lever assembly permitting essentially friction-free rocking movement at the location where motion transmission passes through the wall of the measuring device while retaining complete sealing against leakage.

Still another object resides in the provision of a rocking motion transmitting lever arrangement which includes an annular knife-edged orifice provided in an adaptor plug through a side wall, a V-shaped cross groove in the inner end of the adaptor plug, the bottom of the groove being coplanar with the orifice knife-edge, and a motion transmitting rod passing essentially coaxially through the knife-edged orifice and having an additional straight knife-edged retainer which cooperates with the bottom knife-edged of the V grooves in the adaptor plug to provide limited pivotal movement of the motion transmitting lever on an axis diametral to and in the same plane as the knife-edged orifice.

Further novel features and objects of this invention will become apparent from the following detailed description and the appended claims taken in conjunction with the accompanying drawings showing preferred embodiments thereof, in which:

FIGURE 1 is a sectioned side view of a differential pressure measuring device in which two upper modular sections provide the fluid dampening aspect in accord with this invention;

FIGURE 2 is a section view taken on line 2—2 of FIGURE 1, illustrating the upper surface of the intermediate modular section which includes the adjustable metering valve for the fluid dampening arrangement;

FIGURE 3 is a detail view showing a side elevation of the intermediate modular section with interior details shown in dotted lines;

FIGURE 4 is a sectioned detailed view illustrating the high pressure inlet in the base section together with the O-ring sealed nipple arrangement which enables pressure sealed fluid communication between interconnecting passages in adjacent meter sections;

FIGURE 5 is a section view taken on line 5—5 of FIGURE 1 illustrating the carrier and diaphragm arrangement in the primary measuring diaphragm, portions of the diaphragm being omitted from this view for clarity;

FIGURE 6 is a section taken on line 6—6 of FIGURE 1 illustrating the U-shaped arrangement of the diaphragm biasing spring base member and its relationship to the internal fitting on the end of the motion transmitting rod;

FIGURE 7 is an enlarged detail side view of the motion transmitting assembly shown in section;

FIGURE 8 is a section view of the motion transmitting assembly taken on line 8—8 of FIGURE 7; and FIGURE 9 is a partial vertical section view which includes an upper portion of the base section shown in FIGURE 1 and illustrates an embodiment which does not incorporate the fluid dampening modular sections but instead utilizes merely a cover section providing the pressure portion of the diaphragm measuring chamber.

In the drawings, FIGURE 1 illustrates a preferred embodiment of the differential pressure measuring device 20 in which a horizontally disposed diaphragm assembly 22 is shiftable up and down in response to changes in differential pressures, such as obtained by means of an orifice (not shown) disposed in a fluid flow line. A motion transmitting lever assmbly 24 is connected to the diaphragm assembly 22 and projects through a chamber wall to the exterior of the diaphragm chamber. Measuring device 20 has a pressure housing 26 constructed in stacked sectional form, some sections of which are interchangeable with an alternate section as will be described hereinafter to provide a modified measuring action. In FIGURE 1, housing 26 consists of three sections, a base section 28, an intermediate or center section 30 and an upper or cap section 32. The three sections 28, 30 and 32 are clamped together as a rigid assembly by four large screws 34 which pass freely through holes in the two uppermost sections and are threaded in threaded bores in bottom section 28.

Pressure connections to housing 26 are enabled by two tapped passages 36 (FIGURE 1) and 38 (see FIGURES 4 and 6) from the lower side of bottom section 28. Passage 36 is centered in the bottom wall of base section 28 and is the low-pressure inlet into a cylindrical chamber 40 having an uppermost portion 42 of increased diameter which forms an annular abutment platform 44.

FIGURE 4 shows the location of a drilled passageway 48 which provides fluid communication from the second inlet bore 38 through the base section 28 to the top surface of the base section where it opens into a coextensive drilled passage 50 (FIGURES 2, 3 and 4) in the center housing section 30. Shown in FIGURES 2 and 3, passage 50 leads to a transverse passage 52 which in turn leads to a short vertical passage 54 communicating into a central recess 56 in the upper surface of the center housing section 30. The short passage 54 in fact opens into an annular groove 58 formed in the recess 56 as a precautionary construction to assure that passage 54 will not be inadvertently blocked by the upper diaphragm to be hereinafter described.

Again viewing FIGURE 4, it will be seen that a coupling nipple 60, having circumferential grooves adjacent each end, which carry small O-rings 62 and 64, is spigotted tively at the adjoining ends of passages 48 and 50, and into matched coaxial counterbores 66 and 68 respectively provides a fluid sealed passage between the bottom and the center sections 28 and 30. Thus an inlet passage for fluid is provided from bottom opening 38 to and through passages 48, 50, 52 and 54 into chamber 56 in the upper surface of center housing section 30. As distinguished from low pressure inlet 36 to low pressure chamber 40, inlet 38 will be designated as a high pressure inlet to high pressure chamber 56.

The lower surface of the cap section 32 is recessed to provide a chamber 72 having a peripherally undercut recess 74 into which opens a drilled passage 76 (FIGURE 1). Passage 76 intersects a vertical passage (not shown) leading to the lower surface of the cap section 32 and coextensive with a short vertical passage 78 (FIGURE 3) which leads from the mating surface of center housing section 30, the sealed connection to passage 78 at the joinder between the cap section 32 and center housing section 30 being accomplished by an O-ring nipple coupling 80 (FIGURE 3) similar to nipple 60. Within center section 30 and extending laterally from an intersection with passage 78 is a cross passage 82 (FIGURES 1 and 2) leading to the cylindrical chamber 84 of a needle valve 86. A threaded coaxial counterbore 88 extends from one exterior side of the center section 30 to one end of the needle valve chamber 84, the other end of the needle valve chamber 84 opening into a reduced diameter coaxial passage 90 extending to the approximate center of section 30. The shoulder 92 formed by the intersection between needle valve chamber 84 and passage 90 serves as the seat (which can be tapered) for a valve needle 94 which has an enlarged threaded and slotted head 96, threaded into the counterbore 88. A circumferential groove in needle 94 carries a small O-ring 98 which provides a fluid seal between the needle body and the wall of needle valve chamber 84 to prevent leakage past the needle shank. The aforedescribed passage 90 opens to the center of a stepped recess or chamber 100 in the lower surface of center section 30.

The three housing sections 28, 30 and 32 thus are shaped to form four chambers 40, 100, 56 and 72, from bottom to top. Chamber 40 in base section 28 is isolated from chamber 100 in the lower surface of center section 30 by the previously referred to diaphragm assembly 22 and chamber 56 in the upper surface of center section 30 is isolated from chamber 72 in the cap section 32 by a second diaphragm assembly 102. The two diaphragm assemblies 22 and 102 will be more fully described, however at this point in the description it is noted that each diaphragm assembly can be readily removed when the housing sections are disassembled, the outer peripheral seal between the sections and each diaphragm assembly being accomplished by clamping an outer peripheral bead on the flexible material of each diaphragm assembly in matched annular grooves in the joinder surfaces of the associated sections. This is clearly shown in FIGURE 1 where peripheral bead 106 on diaphragm assembly 22 is clamped and forms a sealed joint between groove 108 in base section 28 and groove 110 in center section 30—and peripheral bead 112 on diaphragm assembly 102 is clamped and forms a sealed joint between groove 114 in the upper surface of center section 30 and groove 116 in the lower surface of cap section 32.

The upper diaphragm assembly 102 is used to isolate dampening fluid from line fluid and at the same time to transmit pressure force from one fluid to the other. Hence it is a relatively simple assembly consisting of a flexible rubber or rubber-like diaphragm 120 with the peripheral bead 112 and an outer annular portion of U-shaped cross section which will permit shifting movement of the diaphragm assembly without stressing the diaphragm material. Two thin discs 122 and 124, one on each side of diaphragm 120 are clamped together by the nut and bolt 126 and serve as stiffeners for the assembly 102.

Diaphragm assembly 22, the assembly by which changes in line fluid pressure are converted to a mechanical indication, is a more complex structure than assembly 102 and in addition includes a pre-set biasing spring subassembly. This main diaphragm assembly 22 includes a flexible rubber or rubber-like diaphragm 130 with the aforedescribed outer peripheral bead 106 and an outer annular portion 132 of U-shaped cross section to enable normal shifting movements of assembly 22 without stressing the diaphragm due to stretching. The inner portion of diaphragm 130 terminates in an annular peripheral bead 134 which is securely clamped between a heavy disc-like diaphragm carrier 136 on the underside and a thin disc 138 on the upper side. The upper disc 138 includes an annular groove 140 which receives the inner peripheral bead 134 of diaphragm 130, preventing any tendency for the diaphragm 130 to be pulled from between carrier 136 and disc 138.

Diaphragm carrier 136 and upper disc 138 are concentrically apertured for receiving a clamping bolt 142, the head 144 of which is shouldered and located below the diaphragm carrier 136. An O-ring 146, carried on the bolt shank, is clamped between the bolt head 144 and carrier 136 when the bolt 142 and its nut 148 are tightened and prevents leakage along the bolt 142 through the center of the diaphragm. The head 144 of bolt 142 is formed with a tapered socket 150 which receives one end of a push link to be hereinafter described.

As has been briefly described, the diaphragm assembly 22 carries its own pre-set biasing spring assembly 152 which consists of a base plate 154 (see FIGURES 1 and 6) and three spaced compression springs 156a, 156b, and 156c connected between the base plate 154 and diaphragm carrier 136. Each compression spring 156 is a straight coil spring having both ends 160 and 162 (FIGURE 1) bent to extend substantially concentric and away from the spring coils. Small ferrules 164 and 166 are fastened to respective spring ends 160 and 162 by brazing. Upper spring end ferrules 164 fit into blind sockets 168 in the lower surface of diaphragm carrier 136 wherein they are secured by set screws 170. The lower spring end ferrules 166 are fitted into vertical holes 172 through the spring base 154 and secured by set screws 174.

Spring base 154 is U-shaped, somewhat in the manner of a horseshoe (FIGURE 6), to enable its removal as part of the diaphragm assembly 22 without disturbing the motion transmitting lever assembly 24. The lower surface of the U-shaped base 154 is planar and rests on a smooth planar upper surface of an annular ridge 178 formed on the base surface of lower chamber 40. Ridge 178 eliminates the need of making the entire bottom surface into a planar mounting pad. The outer periphery of spring base 154 constitutes the major part of a cylindrical surface and has a close free fit within the cylindrical chamber 40. A single screw 180, carrying a sealing O-ring 182 under its head, secures the spring base plate 154 to the lower wall of the housing base section 28, the screw head being recessed into the outer surface of the wall and accessible from the underside of the chamber base section. When housing sections 28 and 30 are disassembled, the outer periphery of diaphragm 130 is released and removal of screw 180 will permit the complete diaphragm assembly 22, its carrier plate 136, biasing springs 156 and spring base plate 154 to be lifted out of bottom section 28 without disturbing the motion lever, thus facilitating changes in the pressure measuring range of the indicator by substituting a complete diaphragm assembly 22 with pre-set biasing spring values as desired.

Lever Assembly

Referring to FIGURES 1, 7 and 8, the motion transmitting lever assembly 24 includes a bushing 200 fixed in the side wall 202 of the chamber base section 28. Bushing 200 is a hardened metal cylinder with a skirted exterior end 204 and a transverse end wall at its interior end 206. The transverse end wall has a central, annular, knife-edged aperture 208 resulting from the tapered bottom of a counterbore 210 from the open skirted end 204 intersecting the plane surface 212 of the interior end 206. A second larger counterbore 214 in the exterior end of bushing 200 provides clearance for lever tilt movement. An annular groove 216 in the external cylindrical surface of bushing 200 retains an O-ring seal 218 which provides a fluid seal between bushing 200 and the cylindrical wall of the side wall aperture 220. Bushing 200 is fastened in base section 28 by a set screw 222 (FIGURE 1), after being inserted through the wall aperture 220 from the inner side of wall 202. The inner end flange 224 of bushing 200 extends in both a radial and an axial disposition and abuts a recessed shoulder 227 at the interior end of side wall aperture 220 to locate the bushing. Flange 224 also prevents interior pressure from blowing the bushing out of the aperture. Shown in FIGURES 1 and 7, V-cuts 226 are machined in diametrically opposite side portions of the axially projected part of flange 224, the bottom of the V-cuts being in the plane of aforedescribed bushing surface 212 and being aligned on a diametrical line of the knife-edge aperture 208.

Lever assembly 24 includes a lever actuator 230 with two diametrically spaced arms 232 at its left hand end and an axial bore 234 in which a small diameter hardened metal rod 236 is secured by a set screw 238. The rod 236 projects through the knife edged aperture 208 in bushing 200 with a close but free fit and is received and fastened in an axial bore 240 in a lever extension bar 242 by a set screw 244. One end 246 of the extension bar 242 is of reduced diameter and terminates closely adjacent the annular knife edge of aperture 208 leaving a very short extent of the small diameter rod 236 between the lever actuator 230 and bar 242 to substantially eliminate possibility of the rod flexing. The arm 232 of lever actuator 230 terminate in horizontally coaligned knife edges 250 which have less of an angle than the V-cuts 226 and rest in the V-cuts 226 so that the straight knife edges 250 are diametrally disposed relative to the bushing axis, on a pivot line disposed in the plane of the annular knife edge of aperture 208 and normal to the direction of movement of diaphragm assembly 22. Extension bar 242 constitutes the exterior end of lever assembly 24 and is connected through linkage not shown to transfer the lever tilting movement to an indicator or control device. Such a linkage, if an example is necessary, is shown and described in copending application Serial No. 626,229.

The straight knife-edged arms 232 form a bridge disposed over a flexible synthetic rubber or other resilient plastic seal 252 having a thin flat disc-shaped body and a central aperture 254 which is snugly fitted around the rod 236 and held against the plane surface 212 of bushing end 206 by a light coil compression spring 256 encircling rod 236 and abutting actuator 230. The seal disc may be cupped so its peripheral rim serves as a spring guide, as in FIGURES 7 and 8. The thin flat seal disc 252, when subjected to pressure from the interior of chamber 40, functions in a manner similar to an O ring in sealing the very small clearance between rod 236 and the knife-edged aperture 208, the light spring 256 merely serving to provide a slight bias to hold the seal washer in place against the wall surface 212 when no fluid pressure is acting on the seal.

A tapered coil spring 260, with its small end fitted over the reduced end portion 246 of extension bar 242 and seated on the extension bar shoulder 248 and with its large end seated at the largest diameter of bushing counterbore 210 serves to urge the knife edges 250 of the lever actuator 230 into close engagement with the base of V-cuts 226. With the knife edges 250 so held, actuator 230 may be rocked up or down through a limited travel of about 10 degrees and theoretically the rod 236 will be exactly centered in the annular knife-edged aperture 208 and will not touch the annular knife edge. The weight of lever assembly 24 is preferably kept to a low value. The lightweight lever assembly supported on the bushing 200 by the cooperation of the arm knife edges 250 in the V-cuts 226 together with the small annular contact of the seal disc 252 on rod 236 and adjacent the knife edged aperture 208 result in negligible friction between the lever assembly 24 and bushing 200.

Bushing 200, lever actuator 230 and small diameter rod 236 are made from hardened metal to prevent wear. If desired, hardening of the bushing 200 and actautor 236 can be localized to the immediate knife-edged portions and the V-cut areas engaged by the actuator knife edges.

The end of the lever actuator 230 opposite knife arms 232 has a flat upper surface 262 constituting a horizontal platform substantially coplanar with the axis of rod 236. A pin hole 264 in the horizontal platform surface 262 diverges into a larger diameter hole 266 in the underside of actuator 230. Pin hole 264 is substantially vertically aligned with the axis of and below the diaphragm socket 150 when lever assembly 24 is horizontally situated and secured in base section 28. A push rod link 270 with an upper conical end 272 situated in the diaphragm socket 150 has a lower rounded end 274 resting on the horizontal platform surface 262. A pin 276 in and extending downwardly from the center of the round push rod end 274 projects through the platform pin hole 264 to retain the push rod on the actuator platform yet permitting the slight rocking movements which occur when the diaphragm assembly 22 shifts up or down.

*Fluid Dampening*

Referring again to the pressure responsive device 20 of FIGURE 1, it will be recalled that the three housing sections 28, 30 and 32 with the two diaphragm assemblies 22 and 102 form four chambers 40, 100, 56 and 72. In chambers 100 and 72, located above diaphragm assemblies 22 and 102, respectively, is some freeze resisting fluid such as "Prestone" (ethylene glycol).

Pressure from the upstream side of a pipeline orifice meter enters chamber 56 through inlet 38, and passages 48, 50, 52 and 54. The pressure in chamber 56 forces diaphragm assembly 102 upward which movement forces the fluid in space 72 through opening 76 into passages 78 and 82 to needle valve chamber 84 and through passage 90 to chamber 100. Needle valve 86, provided in the center section 30, can be adjusted to restrict the flow of fluid between space 72 above diaphragm assembly 102 and space 100 above diaphragm assembly 22. The pressure responsive device 20 may be initially filled with the dampening fluid by removing a plug 280 in cap section 32 which is sealed by O ring 282. The fluid will flow into chamber 72 above diaphragm assembly 102 and through passages 78 and 82 and 90 into chamber 100 above diaphragm assembly 22. When chamber 72 has been filled, plug 280 may be replaced and chamber 56 placed under slight pressure whereupon fluid will flow into chamber 100 above diaphragm assembly 22. This will cause the downward movement of the diaphragm assembly 22 against the springs. Then if pressure is removed from chamber 56, diaphragm assembly 22 will tend to return to original spring biased position, substantially centered, and any air trapped in the chamber 100 will be forced through passages 90, 78, and 76 into uppermost chamber 72. The plug 280 may be removed and upper chamber 72 completely filled with dampening fluid. As the instrument now stands with zero pressure in chamber 56 and chambers 100 and 72 completely filled with fluid, diaphragm plate 122 of assembly 102 will be resting on the bottom surface in chamber 56. It is now necessary to raise diaphragm assembly 102 off the bottom surface of chamber 56 and this is achieved by loosening plug 280 until it can leak and then applying pressure to space 56 until an amount of fluid approximately equal to $\frac{1}{16}''$ gap between 122 and the bottom surface of chamber 56 has flowed out through the threads of plug 280, whereupon the plug is screwed down tight while the position is held by pressure. When pressure in chamber 56 is released, diaphragm assembly 102 will be hanging free without touching the bottom surface, its slight weight creating a small vacuum on the fluid in space 72.

The unit is shown in FIGURE 1 with about approximately one-half of its rated differential pressure applied in chamber 56 and the diaphragm assembly 22 is approximately at half-way position.

As the differential of pressure in the instrument increases and diaphragm assembly 22 shifts its carrier 136 down against the bias of springs 156, the carrier 136 will seat against shoulder abutment 44 in the bottom section 28 thus limiting its downward travel. Further increase in differential pressure will then cause diaphragm loop provided by U-shaped portion 132 to balloon into the confined space between carrier 136 and the periphery of the upper portion 42 of chamber 40, whereupon a complete seal is effected and the diaphragm 130 is protected from rupture. The action when the excess pressure is from the downstream side of the orifice meter is that the upper plate 138 of diaphragm assembly 22 seats against the upper wall of chamber 100 thus forming a small chamber into which the diaphragm may balloon and seal.

*Modified Version*

The differential pressure measuring instrument has been designed to be used without fluid dampening in which instance it provides an extremely sensitive indicator. The modification encompasses removal of various components and use of a modified cap section 290 shown in FIGURE 9.

To accomplish the modification, center section 30 and cap section 32 of the device 20 shown in FIGURE 1 are removed, leaving the base or lower section 28 with all components in that section including the diaphragm assembly 22 and lever assembly 24. Note that the high pressure inlet passage 48 in section 28 with nipple coupling 60 is in and remains in this modification. The modified cap section 290 has a similar external configuration to that of cap section 32 previously described and has corner holes enabling the cap section 290 to be secured to the base section 28 by screws in the same manner as the sections in the FIGURE 1 embodiment are fastened together. Formed in the joinder surface of cap 290 which fits on lower section 28, is an annular groove 292 which fits on and clamps the lower diaphragm bead 106 in place and also provides a seal between cap 290 and lower section 28.

The underside of cap 290 is recessed to provide a chamber 56' shaped essentially like chamber 100 in the underside of the previously described center section 30, which shape permits a limited reverse ballooning of the diaphragm 130. The aforenoted nipple coupling 60 fits into a mating socket 294 in cap 290 from whence passages 296 and 298 lead to the center of chamber 56' and provide for introduction of fluid under pressure from the upstream side of an orifice.

In both the damped and the undamped versions of the measuring instrument the particular type of substantially friction free rocking motion transmission lever is an important factor in obtaining a highly sensitive and accurate measurement because as the diaphragm and its carrier and the opposing bias springs approach a position of balance, the forces, to induce further movement, become very slight and the presence of any friction in the linkage or other means for transmitting the diaphragm carrier motion to the outside of the pressure housing will impair accuracy of measurement.

In operation of either modification, downstream pressure is conducted to opening 36 and upstream pressure to opening 38. The primary purpose in placing inlet to opening 38 in the lower housing section 28 with the resultant channels 48, 50, 52 and 54 communicating from inlet 38 is so that the manifold connections may remain undisturbed when it is necessary to service the instrument.

As differential pressure is increased when the instrument is in operation, the diaphragm assembly 22 moves downward against spring pressure and this motion is transmitted to actuator 230 through push rod 270. This causes the left hand end of extension bar 242 to rise and this motion may be translated, as desired, to a visual indication, to record data, or to provide a control signal, etc.

The foregoing is a description of an improved differential pressure measuring device in which differential pressure causes an approximately lineal motion of a spring opposed diaphragm and this is transmitted to the exterior of the pressure measuring vessel with a minimum loss of accuracy by holding friction loss in the motion transmitting linkage to a minimum. The construction is made to prevent diaphragm rupture by confining ballooning of the diaphragm caused by accidental over-pressuring either side of the diaphragm. The construction includes a unitary diaphragm assembly with an attached biasing spring sub-assembly permitting pre-set diaphragm assemblies to be used for ready interchangeability for use in installations having heavier or lighter pressure measurement ranges. The construction enables use of a plurality of standard major components in an instrument with or without fluid dampening by quick interchange of upper sections. It utilizes an improved low friction rocking motion transmitting lever mechanism which is completely sealed against leakage and is practically friction free at all normal ranges of pressure in the vessel.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a pressure measuring device comprising: a sectional casing; flexible diaphragm means disposed between sections of said casing and forming, with said casing, separate chambers on opposite sides of said diaphragm means; a resilient biasing assembly having a base member; means connecting said biasing assembly to said diaphragm means; means releasably rigidly securing said base member to the interior of said casing, said biasing assembly also including spring means rigidly connected to said base member and, through said connecting means, rigidly connected to said diaphragm and thereby yieldingly opposing movement of said diaphragm in both directions from a zero position; means for transmitting motion from said diaphragm means to the exterior of said casing including a releasable connection to said diaphragm means; said diaphragm and said resilient biasing assembly being a removable unit assembly.

2. A pressure measuring device comprising: a sectional casing; a first flexible diaphragm disposed between an adjacent pair of sections of said casing and forming with said casing a first pair of separate chambers on opposite sides of said diaphragm; a second flexible diaphragm disposed between a second adjacent pair of sections of said casing and forming with said casing a second pair of separate chambers; separate inlet passage means to one chamber of both pairs of chambers enabling application of fluids under separate pressures to each of said one chambers; fluid passage means including metering means providing a closed fluid circuit between the others of both pairs of chambers; a diaphragm thrust means secured to one of said diaphragms within said casing for movement with the diaphragm in response to pressure differentials between said one chamber of both pairs of chambers; a resilient biasing assembly connected to said diaphragm thrust means and having a base member; means releasably and rigidly securing said base member to the interior of said casing; said biasing assembly also including spring means rigidly connected to said base member and rigidly connected to said thrust means and thereby yieldingly opposing movement of said one diaphragm in both directions from a zero position; and means for transmitting motion from said diaphragm means to the exterior of said casing including a releasable connection to said diaphragm thrust means.

3. A pressure measuring device comprising: a sectional casing; a first flexible diaphragm disposed between an adjacent pair of sections of said casing and forming with said casing a first pair of separate chambers on opposite sides of said diaphragm; a second flexible diaphragm disposed between a second adjacent pair of sections of said casing and forming with said casing a second pair of separate chambers; separate inlet passage means to one chamber of both pairs of chambers enabling application of fluids under separate pressures to each of said one chambers; fluid passage means including metering means providing a closed fluid circuit between the others of both pairs of chambers; a diaphragm thrust member secured to one of said diaphragms within said casing for movement with the diaphragm in response to pressure differentials between said one chamber of both pairs of chambers; a resilient biasing assembly connected to said thrust member and having a base member releasably secured to the interior of said casing; said biasing assembly yieldingly opposing movement of said one diaphragm from a zero position; means in the wall of said casing providing an aperture through said wall; a lever member projecting through and adapted to fulcrum at said aperture and having one end disposed between said thrust member and said base member; and a push link means within said casing coupling said one end of said lever member and said diaphragm thrust member; said diaphragm, said thrust member and said resilient biasing assembly being a removable unit.

4. A pressure measuring device as defined in claim 3, wherein said fluid passage means includes an adjustable needle metering valve located within one of the casing sections.

5. A pressure measuring device comprising: a sectional casing; a flexible diaphragm disposed between sections of said casing and forming, with said casing, separate chambers on opposite sides of said diaphragm; a diaphragm thrust member secured to said diaphragm within said casing for movement with the diaphragm in response to pressure differentials between the chambers at opposite sides thereof; a resilient biasing assembly connected to said thrust member and having a base member releasably secured to the interior of said casing, said biasing assembly yieldingly opposing movement of said diaphragm from zero position; means in the wall of said casing providing an aperture through said wall; a lever member projecting through and adapted to fulcrum at said aperture and having one end disposed between said thrust member and said base member; a push link means within said casing coupling said one end of said lever member and said diaphragm thrust member; said diaphragm, said thrust member and said resilient biasing assembly being a removable unit; and said resilient assembly base member having a cut out portion enabling said removable unit to be removed past the lever end which is disposed between said thrust member and said base member, and said push link means is constructed to enable separatory movement of said removable unit from connection with said lever upon removal of said removable unit.

6. For use in combination with a pressure measuring device; a sheet form diaphragm means having a rigid central thrust member; and at least one preload coil spring having one end rigidly fixed directly in said thrust member and means rigidly secured on the other end of said coil spring including provisions adapting said other end to be secured to a wall of the pressure measuring device, said rigid connections of said spring ends enabling transfer of spring bias forces resulting from both tension and compression of said spring.

7. A pressure measuring device comprising: a sectional casing; a flexible diaphragm disposed between sections of said casing and forming, with said casing, separate chambers on opposite sides of said diaphragm; a diaphragm thrust member secured to said diaphragm within said casing for movement with the diaphragm in response to pressure differentials between the chambers at opposite sides thereof; a resilient biasing assembly connected to said thrust member and having a base member releasably secured to the interior of said casing, said biasing assembly yieldingly opposing movement of said diaphragm from zero position; means in the wall of said casing providing an aperture through said wall; a lever member projecting through and adapted to fulcrum at said aperture and having one end disposed between said thrust member and said base member; a push link means within said casing coupling said one end of said lever member and said diaphragm thrust member; said diaphragm, said thrust member and said resilient biasing assembly being a removable unit; and said resilient assembly base member has a cutout portion enabling said removable unit to be removed past the lever end which is disposed between said thrust member and said base member.

8. For use in a differential pressure indicator a preset biased diaphragm assembly comprising: a flexible diaphragm member with means at its outer peripheral edge enabling clamping and sealing of said diaphragm between indicator casing sections; a rigid diaphragm thrust member secured centrally on said diaphragm; a rigid base member adapted to be fastened to a wall of the indicator; resilient means connecting between said thrust member and said rigid base member enabling biased movement of said thrust member toward and away from said base member from a neutral position; an indicator coupling located on the central portion of said thrust member; the connection of said resilient means to said thrust member being independent of said indicator coupling and offset radially outward from the center of said thrust member; and said rigid base member having a substantially horizontal U-shape providing a side cutout portion enabling the diaphragm assembly as a unit to be installed and removed in an indicator without interference with indicator motion transfer linkage.

9. For use in a differential pressure indicator a preset biased diaphragm assembly comprising: a flexible diaphragm member with radially outer peripheral edge means enabling clamping and sealing of said diaphragm between indicator casing sections; a rigid diaphragm thrust member secured centrally on said diaphragm to provide an annular flexible diaphragm portion surrounding said thrust member and permitting movement of the thrust member in a direction transverse to the diaphragm; a rigid base member adapted to be fastened to a wall of the indicator; resilient means centrally disposed relative to said annular diaphragm portion capable of resisting tension and compression loads in opposed directions from a neutral position and aligned with the direction of movement of said thrust member; means rigidly connecting said resilient means respectively to both said thrust member and to said rigid base member thereby enabling movement of said thrust member in each of said opposed directions from a neutral position against the compression resisting bias of said resilient means in one of said directions toward said base member and against tension resisting bias of said resilient means in the other of said directions away from said base member.

10. A pre-set biased diaphragm assembly as defined in claim 9 wherein an indicator coupling is centrally located on said thrust member and said means rigidly connecting said resilient means to said thrust member is offset radially outward from the indicator coupling and radially inward from said annular flexible diaphragm portion.

11. A pre-set biased diaphragm assembly as defined in claim 10, wherein said resilient means consists of a plurality of coil springs with end pieces and said means rigidly connecting said resilient means to the thrust member and the base member comprise means rigidly securing one end piece of each said spring in said thrust member and means rigidly securing the other end piece of each said spring in said base member.

References Cited in the file of this patent

UNITED STATES PATENTS

| | | |
|---|---|---|
| 1,992,048 | Temple | Feb. 19, 1935 |
| 2,601,511 | Gaffney | June 24, 1952 |
| 2,664,108 | Von Weise | Dec. 29, 1953 |
| 2,737,973 | Kimmell | Mar. 13, 1956 |
| 2,989,084 | Jones | June 20, 1961 |

FOREIGN PATENTS

| | | |
|---|---|---|
| 599,446 | Canada | June 7, 1960 |
| 512,574 | Great Britain | Sept. 20, 1939 |

UNITED STATES PATENT OFFICE
CERTIFICATE OF CORRECTION

Patent No. 3,136,130                              June 9, 1964

John B. McGay

It is hereby certified that error appears in the above numbered patent requiring correction and that the said Letters Patent should read as corrected below.

Column 4, line 8, strike out "into matched coaxial counterbores 66 and 68 respec-" and insert the same after "spigotted" in line 6, same column 4; column 6, line 25, for "pressure" read -- pressures --.

Signed and sealed this 17th day of November 1964.

(SEAL)
Attest:

ERNEST W. SWIDER
Attesting Officer

EDWARD J. BRENNER
Commissioner of Patents